US012030324B2

(12) United States Patent
Kinoshita et al.

(10) Patent No.: US 12,030,324 B2
(45) Date of Patent: Jul. 9, 2024

(54) PRINTING APPARATUS

(71) Applicant: SEIKO EPSON CORPORATION, Tokyo (JP)

(72) Inventors: Ryohei Kinoshita, Matsumoto (JP); Takeshi Tokuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 17/809,490

(22) Filed: Jun. 28, 2022

(65) Prior Publication Data

US 2022/0410603 A1 Dec. 29, 2022

(30) Foreign Application Priority Data

Jun. 29, 2021 (JP) ................................ 2021-108068

(51) Int. Cl.

*B41J 29/13* (2006.01)
*B41J 15/04* (2006.01)
*G03G 21/16* (2006.01)

(52) U.S. Cl.

CPC ............. *B41J 29/13* (2013.01); *B41J 15/044* (2013.01); *G03G 21/1633* (2013.01)

(58) Field of Classification Search

CPC ........ B41J 29/13; B41J 15/044; B41J 15/042; B41J 2/32; B41J 29/393; G03G 21/1633

See application file for complete search history.

(56) References Cited

U.S. PATENT DOCUMENTS

2020/0130970 A1* 4/2020 Yada ...................... B65H 16/06

FOREIGN PATENT DOCUMENTS

| | | |
|---|---|---|
| JP | H07-017549 U | 3/1995 |
| JP | 2013-049175 | 3/2013 |
| JP | 2020-066523 | 4/2020 |

* cited by examiner

*Primary Examiner* — Bradley W Thies

(74) *Attorney, Agent, or Firm* — WORKMAN NYDEGGER

(57) ABSTRACT

Included are a rolled-paper accommodation unit configured to accommodate rolled paper; a thermal head that performs printing on recording paper pulled out from the rolled paper; a control unit configured to control the thermal head; an apparatus case in which the rolled-paper accommodation unit and the control unit are provided, the apparatus case having a first edge forming a discharge opening through which the recording paper on which the thermal head performed printing is discharged; and an opening/closing cover opening or closing the rolled-paper accommodation unit and having a second edge that faces the first edge to form the discharge opening when the opening/closing cover closes the rolled-paper accommodation unit. The rolled-paper accommodation unit is provided between the first edge of the apparatus case and the control unit.

12 Claims, 4 Drawing Sheets

PRINTING APPARATUS

The present application is based on, and claims priority from JP Application Serial Number 2021-108068, filed Jun. 29, 2021, the disclosure of which is hereby incorporated by reference herein in its entirety.

BACKGROUND

1. Technical Field

The present disclosure relates to a printing apparatus.

2. Related Art

As disclosed in JP-A-2020-66523, a printer apparatus has been known that includes an installation area in which rolled recording paper is accommodated, a discharge opening through which the recording paper is discharged, and a control substrate. In this printer apparatus, the control substrate and the discharge opening are provided on the same side relative to the installation area. Therefore, the control substrate is close to the discharge opening.

In a printer apparatus according to the related art, a control substrate is close to a discharge opening. Therefore, when liquid, such as water, enters from the discharge opening into the printer apparatus, the liquid having entered easily reaches the control substrate. When the liquid reaches the control substrate, adverse effects, such as a short circuit, occur in the control substrate.

SUMMARY

A printing apparatus includes: a rolled-paper accommodation unit configured to accommodate rolled paper; a printing unit that performs printing on recording paper pulled out from the rolled paper; a control unit configured to control the printing unit; an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit. The rolled-paper accommodation unit is provided between the first edge of the apparatus case and the control unit.

A printing apparatus includes: a rolled-paper accommodation unit configured to accommodate rolled paper; a printing unit that performs printing on recording paper pulled out from the rolled paper; a control unit configured to control the printing unit; an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit. The first edge is provided in a first direction that is one of length directions of the apparatus case and is relative to the rolled-paper accommodation unit. The control unit is provided in a second direction that is opposite from the first direction and is relative to the rolled-paper accommodation unit.

DESCRIPTION OF EXEMPLARY EMBODIMENTS

Hereinafter, a printing apparatus 1 according to an embodiment of a printing apparatus will be described with reference to the accompanying drawings. The printing apparatus 1 is a mobile printer and is portable in size. The following description is made using directions based on an XYZ orthogonal coordinate system illustrated in each of the drawings. However, these directions are only for convenience of the description and do not limit the following embodiments in any way.

Figure 1:
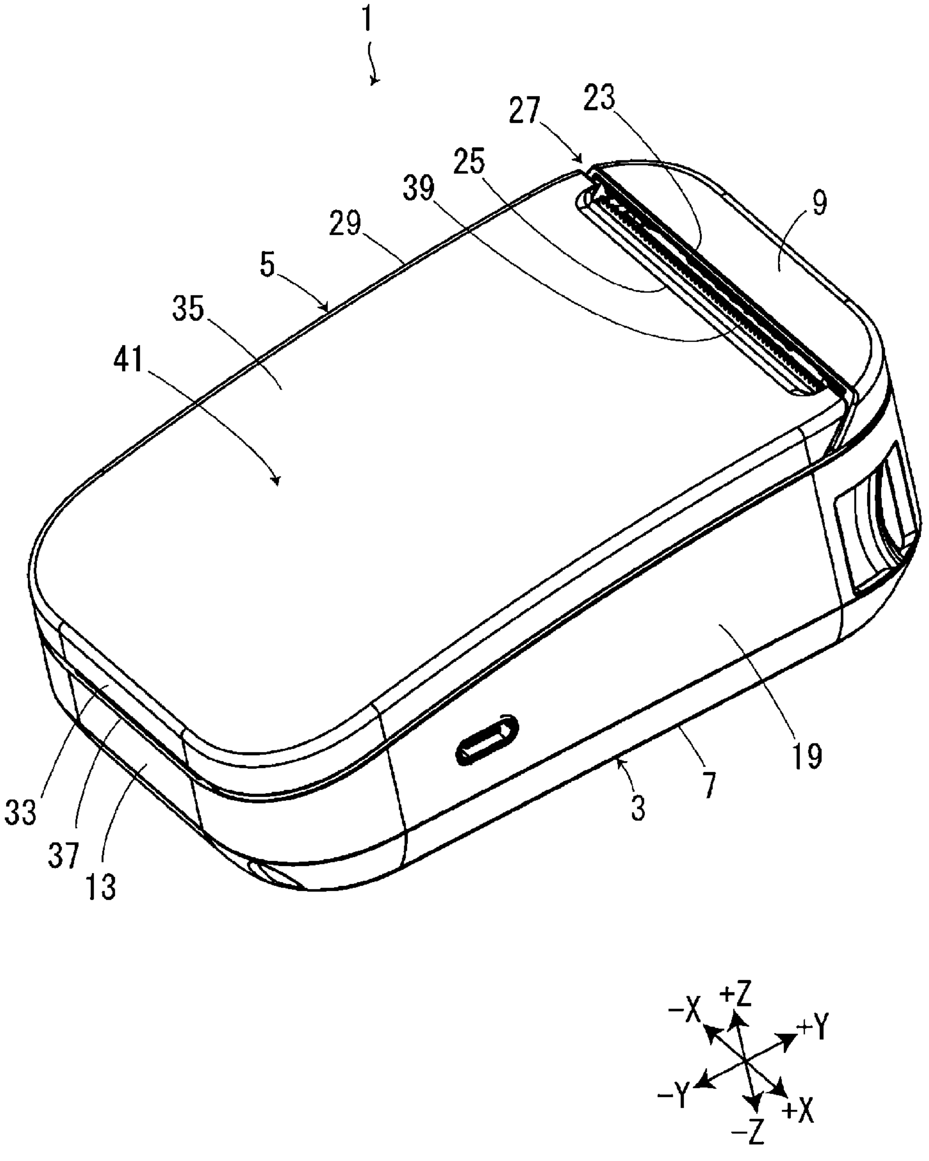
FIG. 1 is a perspective view of a printing apparatus an opening/closing cover of which closes a rolled-paper accommodation unit.
Figure 2:
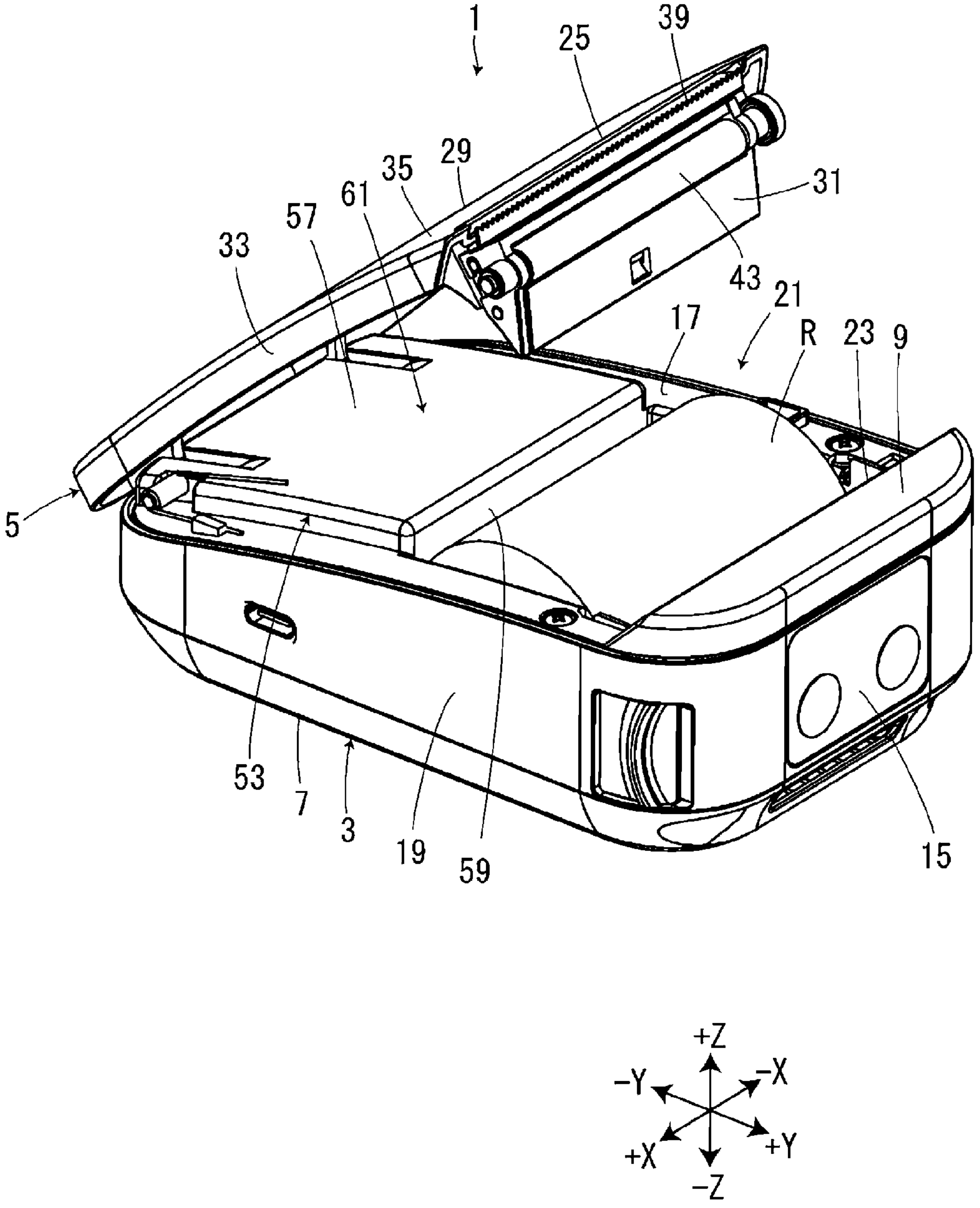
FIG. 2 is a perspective view of the printing apparatus the opening/closing cover of which opens the rolled-paper accommodation unit.
Figure 3:
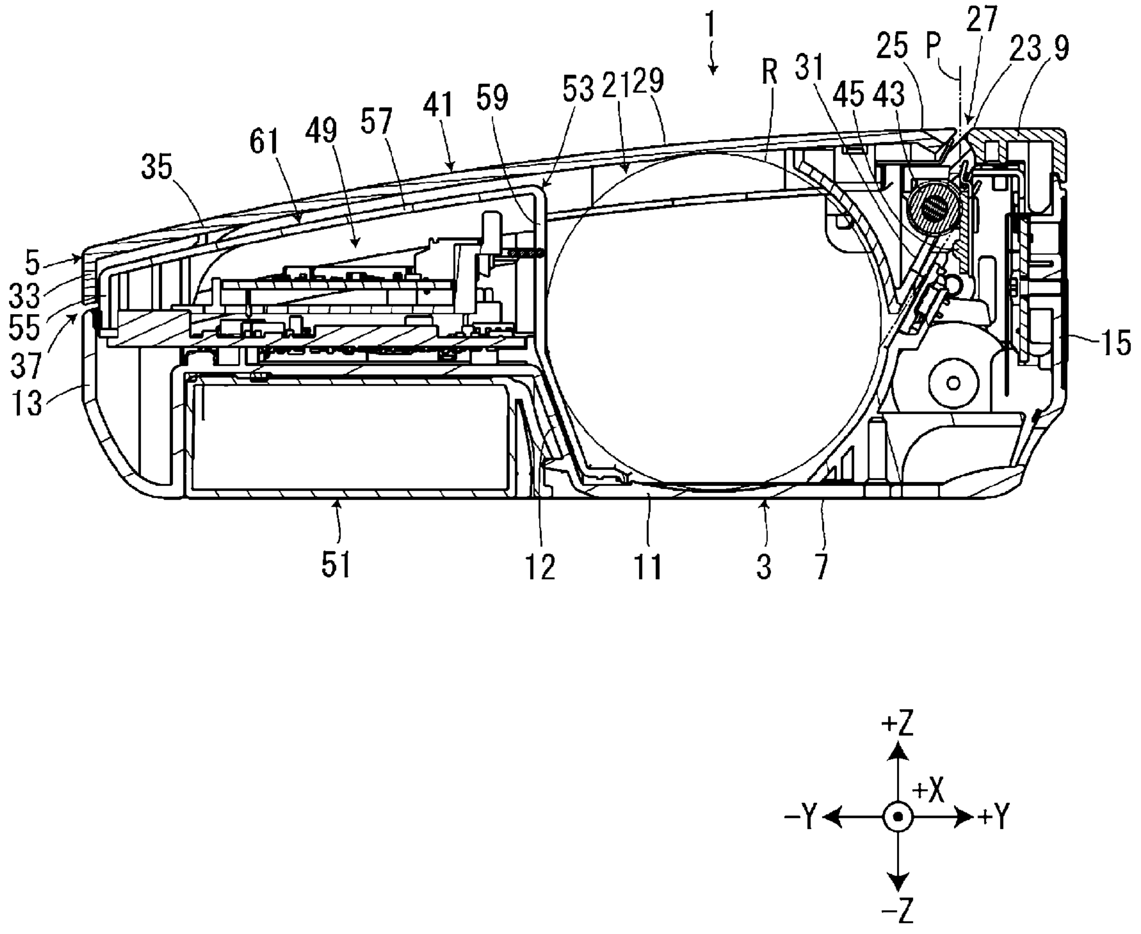
FIG. 3 is a cross-sectional view of the printing apparatus the opening/closing cover of which closes the rolled-paper accommodation unit.
Figure 4:
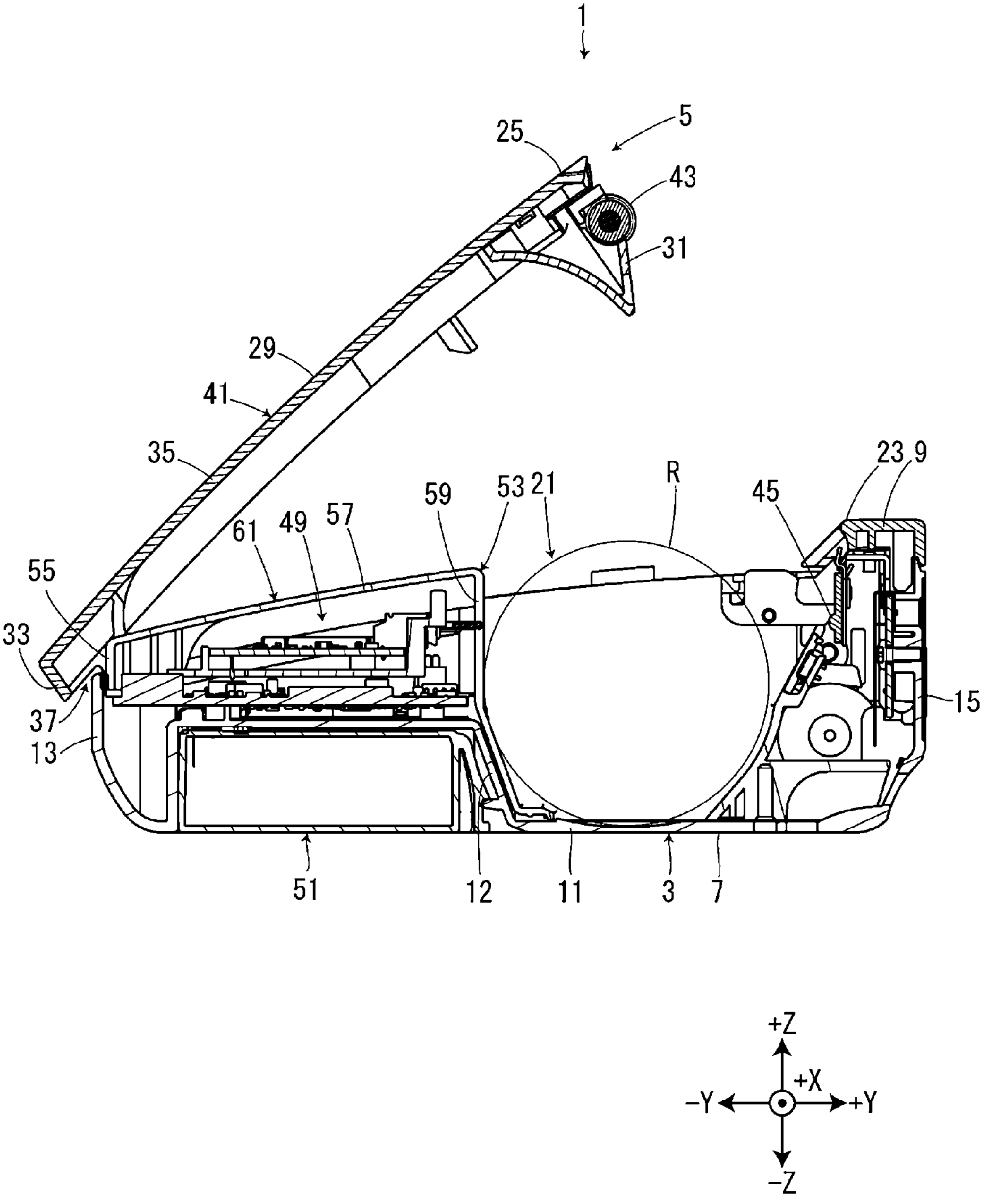
FIG. 4 is a cross-sectional view of the printing apparatus the opening/closing cover of which opens the rolled-paper accommodation unit.

As illustrated in FIGS. 1 to 4, the printing apparatus 1 has a substantially cuboid shape. The printing apparatus 1 includes an apparatus case 3 and an opening/closing cover 5. The apparatus case 3 and the opening/closing cover 5 form an outer shell of the printing apparatus 1.

The apparatus case 3 includes a first apparatus-case section 7 and a second apparatus-case section 9. The first apparatus-case section 7 has a box-like shape in which a side in the +Z direction is open. The first apparatus-case section 7 includes a first case wall 11, a second case wall 13, a third case wall 15, a fourth case wall 17, and a fifth case wall 19.

The first case wall 11 forms a side, in the −Z direction, of the first apparatus-case section 7. A first portion 12 is provided inside the first case wall 11. The first portion 12 extends in the +Z direction from a bottom wall of a rolled-paper accommodation unit 21 described below. The second case wall 13 forms a side, in the −Y direction, of the first apparatus-case section 7. The third case wall 15 forms a side, in the +Y direction, of the first apparatus-case section 7. The fourth case wall 17 forms a side, in the −X direction, of the first apparatus-case section 7. The fifth case wall 19 forms a side, in the +X direction, of the first apparatus-case section 7. The second apparatus-case section 9 is provided to close an end, in the +Y direction, of the side, in the +Z direction, of the first apparatus-case section 7.

In the apparatus case 3, the rolled-paper accommodation unit 21 is provided at substantially the center, in the Y direction that is a length direction of the apparatus case 3, of the apparatus case 3. The rolled-paper accommodation unit 21 accommodates rolled paper R that includes recording paper P wound and serving as a printing medium. The rolled paper R is loaded into the rolled-paper accommodation unit 21 in a drop-in manner. The printing apparatus 1 performs printing on the recording paper P pulled out from the rolled paper R accommodated in the rolled-paper accommodation unit 21.

An end, in the −Y direction, of the second apparatus-case section 9 is provided with a first edge 23. The first edge 23 is located in the +Y direction relative to the rolled-paper accommodation unit 21. The first edge 23 forms a discharge opening 27 between the first edge 23 and a second edge 25 provided for the opening/closing cover 5. The discharge opening 27 has a substantially rectangular shape long in the X direction.

The opening/closing cover 5 opens or closes the rolled-paper accommodation unit 21. The opening/closing cover 5 is rotatably attached to an end, in the −Y direction, of the first apparatus-case section 7 in such a manner that the opening/closing cover 5 is rotatable on an axis substantially parallel to the X direction. The opening/closing cover 5 includes a cover main body 29 and a guiding member 31.

The cover main body 29 includes a first cover wall 33 and a second cover wall 35. The first cover wall 33 extends in the −Z direction from the edges of the second cover wall 35 except the edge, in the +Y direction, of the second cover wall 35. A case opening 37 is provided between the first cover wall 33 and the second case wall 13 of the first apparatus-case section 7. The case opening 37 has a slit-like shape long in the X direction.

The second cover wall 35 and the first case wall 11 are located on opposite sides relative to the rolled-paper accommodation unit 21. That is to say, the second cover wall 35 and the second apparatus-case section 9 close the side, in the +Z direction, of the first apparatus-case section 7.

An end, in the +Y direction, of the second cover wall 35, that is a front end of the opening/closing cover 5, is provided with the second edge 25. The second edge 25 is located in the +Y direction relative to the rolled-paper accommodation unit 21. When the opening/closing cover 5 closes the rolled-paper accommodation unit 21, the second edge 25 faces the first edge 23 to form the discharge opening 27. The second edge 25 is provided with a manual cutter 39 for manually cutting the recording paper P.

The second cover wall 35 is provided with a first slope 41. The first slope 41 slopes downward from the discharge opening 27 when the opening/closing cover 5 closes the rolled-paper accommodation unit 21 and the first case wall 11 is horizontal (see FIG. 3). That is to say, of both ends, in the Y direction, of the first slope 41, the end in the +Y direction, that is, the end close to the discharge opening 27 is located in the +Z direction relative to, that is, above the end in the −Y direction, that is, the end farther from the discharge opening 27. In other words, the end, in the +Y direction, of the first slope 41 is located uppermost in the +Z direction in the second cover wall 35.

Therefore, even when liquid, such as water, splashes on the second cover wall 35, the liquid flows along the first slope 41 to the side opposite from the discharge opening 27. Therefore, liquid splashing on the second cover wall 35 and entering the apparatus case 3 from the discharge opening 27 is restricted.

The guiding member 31 protrudes from the inside of the second edge 25. The guiding member 31 guides, to the discharge opening 27, the recording paper P pulled out from the rolled paper R. When the guiding member 31 is seen from the +Y direction, the guiding member 31 has a substantially rectangular shape long in the X direction. The dimension, in the X direction, of the guiding member 31 is substantially equal to the dimension, in the X direction, of the discharge opening 27.

The guiding member 31 is provided between the discharge opening 27 and the rolled-paper accommodation unit 21. Therefore, when liquid enters from the discharge opening 27, the guiding member 31 guides the liquid having entered, to the rolled-paper accommodation unit 21. The liquid guided to the rolled-paper accommodation unit 21 is absorbed by the rolled paper R accommodated in the rolled-paper accommodation unit 21. Therefore, even when liquid enters from the discharge opening 27, the liquid that has entered flowing toward a control unit 49 provided in the −Y direction relative to the rolled-paper accommodation unit 21, as described below, is restricted.

The printing apparatus 1 includes a platen roller 43, a thermal head 45, the control unit 49, a battery accommodation unit 51, and a cover unit 53.

The platen roller 43 is provided inside the opening/closing cover 5. The rotation axis direction is substantially parallel to the X direction. The platen roller 43 is located in the +Y direction relative to the rolled-paper accommodation unit 21 when the opening/closing cover 5 closes the rolled-paper accommodation unit 21. The platen roller 43 pinches and holds the recording paper P between the platen roller 43 and the thermal head 45. Further, the platen roller 43 rotates by a feed motor (not illustrated) as a drive source. Consequently, the platen roller 43 pulls out the recording paper P from the rolled paper R and feeds the recording paper P toward the discharge opening 27. The platen roller 43 may also be referred to as a transporting roller.

The thermal head 45 is provided in the apparatus case 3 in such a manner that the thermal head 45 faces the platen roller 43. The thermal head 45 is located in the +Y direction relative to the rolled-paper accommodation unit 21. The thermal head 45 includes a plurality of heating elements (not illustrated) and performs printing on the recording paper P pulled out from the rolled paper R.

The control unit 49 controls each unit of the printing apparatus 1, such as the feed motor and the thermal head 45. The control unit 49 is located in the −Y direction relative to the rolled-paper accommodation unit 21. That is to say, the rolled-paper accommodation unit 21 is provided between the first edge 23 and the control unit 49. With respect to a length direction of the apparatus case 3, that is, the Y direction, the first edge 23 is provided in the +Y direction relative to the rolled-paper accommodation unit 21, whereas the control unit 49 is provided in the −Y direction, opposite from the +Y direction, relative to the rolled-paper accommodation unit 21. In other words, with respect to a direction orthogonal to a length direction of the discharge opening 27, that is, with respect to the Y direction, the first edge 23 is provided in the +Y direction relative to the rolled-paper accommodation unit 21, whereas the control unit 49 is provided in the −Y direction, opposite from the +Y direction, relative to the rolled-paper accommodation unit 21. Further, the control unit 49 is provided in the +Z direction relative to the bottom wall of the rolled-paper accommodation unit 21.

The control unit 49 includes a control substrate not illustrated. Electronic components, such as a processor and memory, are mounted on the control substrate. As the processor, a central processing unit (CPU) or an application-specific integrated circuit (ASIC) can be used, for example. As the memory, read-only memory (ROM) and random-access memory (RAM) can be used, for example. The control unit 49 may be formed by an analog circuit.

The battery accommodation unit 51 is located in the −Y direction relative to the rolled-paper accommodation unit 21. That is to say, the rolled-paper accommodation unit 21 is provided between the first edge 23 and the battery accommodation unit 51. The battery accommodation unit 51 is provided in the −Z direction relative to the control unit 49.

The battery accommodation unit 51 detachably accommodates a battery (not illustrated) serving as a power source of the printing apparatus 1.

The cover unit 53 is provided between the opening/closing cover 5 and the control unit 49. The cover unit 53 includes a first cover section 55, a second cover section 57, and a third cover section 59.

The first cover section 55 extends in the −Z direction from an end, in the −Y direction, of the second cover section 57. The first cover section 55 is provided in the −Y direction relative to the control unit 49. That is to say, the first cover section 55 covers the −Y direction side of the control unit 49. The first cover section 55 is located inside the case opening 37. The second cover section 57 is provided in the +Z direction relative to the control unit 49. That is to say, the second cover section 57 covers the +Z direction side of the control unit 49. The third cover section 59 extends in the −Z direction from an end, in the +Y direction, of the second cover section 57. The third cover section 59 is provided in the +Y direction relative to the control unit 49. That is to say, the third cover section 59 covers the +Y direction side of the control unit 49. The third cover section 59 is able to be in contact with a surface, in the −Y direction, of the rolled paper R. The third cover section 59 forms part of the rolled-paper accommodation unit 21. A substantially half, in the −Z direction, the third cover section 59 is provided along the first portion 12 in such a manner that the substantially half the third cover section 59 is in contact with the first portion 12.

In this manner, the cover unit 53 covers the control unit 49. Since the cover unit 53 covers the control unit 49, the liquid entering the control unit 49 is restricted, even when liquid enters from the discharge opening 27, passes the rolled-paper accommodation unit 21, and flows toward the control unit 49. Further, the control unit 49 is not exposed even when the opening/closing cover 5 opens the rolled-paper accommodation unit 21. Therefore, liquid splashing on the control unit 49 is restricted. Further, the control unit 49 is provided in the +Z direction from the bottom wall of the rolled-paper accommodation unit 21, and the first portion 12 and the third cover section 59 seal the space between the control unit 49 and the bottom wall of the rolled-paper accommodation unit 21. Therefore, liquid entering the control unit 49 from the bottom wall of the rolled-paper accommodation unit 21 is restricted. The third cover section 59 and the first portion 12 may be formed by a single member.

The opening/closing cover 5 covers the outside of the cover unit 53. That is to say, when the opening/closing cover 5 closes the rolled-paper accommodation unit 21, the opening/closing cover 5 covers the control unit 49, with the cover unit 53 interposed between the opening/closing cover 5 and the control unit 49. Therefore, the opening/closing cover 5 restricts liquid splashing on the control unit 49.

The second cover section 57 is provided with a second slope 61. The second slope 61 slopes downward toward the case opening 37 when the first case wall 11 is horizontal (see FIG. 3). That is to say, of both ends, in the Y direction, of the second slope 61, the end in the −Y direction, that is, the end close to the case opening 37, is located in the −Z direction relative to, that is, below the end in the +Y direction, that is, the end farther from the case opening 37.

Therefore, even when liquid splashes on the second cover section 57, the liquid flows toward the case opening 37 along the second slope 61 and is discharged from the case opening 37. Therefore, liquid splashing on the second cover section 57, remaining in the apparatus case 3, and entering the control unit 49 is restricted. The second slope 61 is substantially parallel to the first slope 41 provided for the opening/closing cover 5.

As described above, according to the printing apparatus 1 of the present embodiment, the rolled-paper accommodation unit 21 is provided between the first edge 23 and the control unit 49, that is, between the discharge opening 27 and the control unit 49. Therefore, even when liquid enters from the discharge opening 27 formed between the first edge 23 and the second edge 25, the liquid having entered from the discharge opening 27 remains in the rolled-paper accommodation unit 21 before reaching the control unit 49. Consequently, the liquid is absorbed by the rolled paper R accommodated in the rolled-paper accommodation unit 21. Therefore, liquid entering from the discharge opening 27 and reaching the control unit 49 is restricted. Consequently, adverse effects, such as a short circuit, to be caused in the control unit 49 by the liquid is restricted.

According to the printing apparatus 1 of the present embodiment, the rolled-paper accommodation unit 21 is provided between the first edge 23 and the battery accommodation unit 51, that is, between the discharge opening 27 and the battery accommodation unit 51. Therefore, even when liquid enters from the discharge opening 27 formed between the first edge 23 and the second edge 25, the liquid having entered from the discharge opening 27 remains in the rolled-paper accommodation unit 21 before reaching the battery accommodation unit 51. Consequently, the liquid is absorbed by the rolled paper R accommodated in the rolled-paper accommodation unit 21. Therefore, liquid entering from the discharge opening 27 and reaching the battery accommodation unit 51 is restricted. Consequently, adverse effects, such as a short circuit, to be caused in the battery accommodation unit 51 by the liquid 1 is restricted.

Other Modifications

It is needless to say that the present disclosure is not limited to the above-described embodiment, and various configurations can be adopted without departing from the spirit of the present disclosure. In addition to the above-described embodiment, the above-described embodiment may be modified into the following embodiment, for example. The embodiments and modifications may be combined with each other.

The rolled-paper accommodation unit 21 is provided between the first edge 23 and the control unit 49 in a length direction of the apparatus case 3. However, the rolled-paper accommodation unit 21 may be provided between the first edge 23 and the control unit 49 in a width direction of the apparatus case 3 instead of the length direction of the apparatus case 3. That is to say, the first edge 23 may be provided in a first direction being one of width directions of the apparatus case 3, relative to the apparatus case 3. The control unit 49 may be provided in a second direction being opposite from the first direction, relative to the apparatus case 3.

The printing method of the printing apparatus 1 is not limited to the thermal method, and may be, for example, an ink jet method or an electrophotographic method.

The printing apparatus 1 is not limited to a mobile printer, and may be a printer installed on a desk, a floor, or the like.

Supplementary Note

Hereinafter, printing apparatuses will be additionally described.

A printing apparatus includes: a rolled-paper accommodation unit configured to accommodate rolled paper; a printing unit that performs printing on recording paper pulled out from the rolled paper; a control unit configured to control the printing unit; an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit. The rolled-paper accommodation unit is provided between the first edge of the apparatus case and the control unit.

According to this configuration, the rolled-paper accommodation unit is provided between the first edge and the control unit. Therefore, even when liquid enters from the discharge opening formed between the first edge and the second edge, the liquid having entered from the discharge opening remains in the rolled-paper accommodation unit before reaching the control unit. Consequently, the liquid is absorbed by the rolled paper accommodated in the rolled-paper accommodation unit. Therefore, liquid entering from the discharge opening and reaching the control unit is restricted.

The thermal head 45 is an example of the “printing unit”.

Here, the apparatus case may have a first wall, the opening/closing cover may have a second wall, the first wall and the second wall may be on opposite sides relative to the rolled-paper accommodation unit, and the second wall may be provided with a first slope sloping downward from the discharge opening when the opening/closing cover closes the rolled-paper accommodation unit and the first wall is horizontal.

According to this configuration, even when liquid splashes on the second wall, the liquid flows along the first slope to the side opposite from the discharge opening. Therefore, liquid splashing on the second wall and entering the apparatus case from the discharge opening is restricted.

The first case wall 11 is an example of the “first wall”. The second cover wall 35 is an example of the “second wall”.

Here, the printing apparatus may include a cover unit provided between the opening/closing cover and the control unit and covering the control unit.

According to this configuration, the cover unit covers the control unit. Therefore, even when liquid enters from the discharge opening, passes the rolled-paper accommodation unit, and flows toward the control unit, the liquid entering the control unit is restricted.

Here, the printing apparatus may include a battery accommodation unit in which a battery supplying electrical energy to the printing unit is accommodated, and the rolled-paper accommodation unit may be provided between the discharge opening and the battery accommodation unit.

According to this configuration, the rolled-paper accommodation unit is provided between the first edge and the battery accommodation unit. Therefore, even when liquid enters from the discharge opening formed between the first edge and the second edge, the liquid having entered from the discharge opening remains in the rolled-paper accommodation unit before reaching the battery accommodation unit. Consequently, the liquid is absorbed by the rolled paper accommodated in the rolled-paper accommodation unit. Therefore, liquid entering from the discharge opening and reaching the battery accommodation unit is restricted.

Here, the opening/closing cover may cover the control unit when the opening/closing cover closes the rolled-paper accommodation unit.

According to this configuration, the opening/closing cover restricts liquid splashing on the control unit.

Here, the opening/closing cover may include a guiding member protruding from an inside of the second edge and guiding the recording paper to the discharge opening.

According to this configuration, when liquid enters from the discharge opening, the guiding member guides the liquid having entered, to the rolled-paper accommodation unit. The liquid guided to the rolled-paper accommodation unit is absorbed by the rolled paper accommodated in the rolled-paper accommodation unit. Therefore, even when liquid enters from the discharge opening, the liquid that has entered flowing toward the control unit is restricted.

A printing apparatus includes: a rolled-paper accommodation unit configured to accommodate rolled paper; a printing unit that performs printing on recording paper pulled out from the rolled paper; a control unit configured to control the printing unit; an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit. The first edge is provided in a first direction, one of length directions of the apparatus case, relative to the rolled-paper accommodation unit. The control unit is provided in a second direction, opposite from the first direction, relative to the rolled-paper accommodation unit.

According to this configuration, the control unit and the first edge are provided on opposite sides relative to the rolled-paper accommodation unit. Therefore, even when liquid enters from the discharge opening formed between the first edge and the second edge, the liquid having entered from the discharge opening remains in the rolled-paper accommodation unit before reaching the control unit. Consequently, the liquid is absorbed by the rolled paper accommodated in the rolled-paper accommodation unit. Therefore, liquid entering from the discharge opening and reaching the control unit is restricted.

The +Y direction is an example of the “first direction”. The −Y direction is an example of the “second direction”. The Y direction may be described as a direction intersecting an axial direction of a platen roller.

What is claimed is:

1. A printing apparatus comprising:

a rolled-paper accommodation unit configured to accommodate rolled paper;

a printing unit that performs printing on recording paper pulled out from the rolled paper;

a control unit configured to control the printing unit;

an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit, wherein the rolled-paper accommodation unit is provided between the first edge of the apparatus case and the control unit.

2. The printing apparatus according to claim 1, wherein the apparatus case has a first wall, the opening/closing cover has a second wall, and the first wall and the second wall are on opposite sides relative to the rolled-paper accommodation unit and the second wall is provided with a first slope sloping downward from the discharge opening when the opening/closing cover closes the rolled-paper accommodation unit and the first wall is horizontal.

3. The printing apparatus according to claim 1, further comprising a cover unit provided between the opening/closing cover and the control unit and covering the control unit.

4. The printing apparatus according to claim 1, further comprising a battery accommodation unit in which a battery supplying electrical energy to the printing unit is accommodated, wherein the rolled-paper accommodation unit is provided between the discharge opening and the battery accommodation unit.

5. The printing apparatus according to claim 1, wherein the opening/closing cover covers the control unit when the opening/closing cover closes the rolled-paper accommodation unit.

6. The printing apparatus according to claim 1, wherein the opening/closing cover includes a guiding member protruding from an inside of the second edge and guiding the recording paper to the discharge opening.

7. A printing apparatus comprising:

a rolled-paper accommodation unit configured to accommodate rolled paper;

a transporting roller that pulls out and transports recording paper from the rolled paper;

a printing unit that performs printing on the recording paper transported;

a control unit configured to control the printing unit;

an apparatus case in which the rolled-paper accommodation unit and the control unit are provided, the apparatus case having a first edge forming a discharge opening through which the recording paper on which the printing unit performed printing is discharged; and an opening/closing cover opening or closing the rolled-paper accommodation unit and having a second edge that faces the first edge to form the discharge opening when the opening/closing cover closes the rolled-paper accommodation unit, wherein the printing unit is provided at one side of the rolled-paper accommodation unit, and the control unit is provided at another side of the rolled-paper accommodation unit in a direction intersecting an axial direction of the transporting roller.

8. The printing apparatus according to claim 7, wherein the apparatus case has a first wall, the opening/closing cover has a second wall, and the first wall and the second wall are on opposite sides relative to the rolled-paper accommodation unit and the second wall is provided with a first slope sloping downward from the discharge opening when the opening/closing cover closes the rolled-paper accommodation unit and the first wall is horizontal.

9. The printing apparatus according to claim 7, further comprising a cover unit provided between the opening/closing cover and the control unit and covering the control unit.

10. The printing apparatus according to claim 7, further comprising a battery accommodation unit in which a battery supplying electrical energy to the printing unit is accommodated, wherein the rolled-paper accommodation unit is provided between the discharge opening and the battery accommodation unit.

11. The printing apparatus according to claim 7, wherein the opening/closing cover covers the control unit when the opening/closing cover closes the rolled-paper accommodation unit.

12. The printing apparatus according to claim 7, wherein the opening/closing cover includes a guiding member protruding from an inside of the second edge and guiding the recording paper to the discharge opening.

* * * * *